United States Patent
Schlenoff et al.

(10) Patent No.: US 7,223,327 B2
(45) Date of Patent: May 29, 2007

(54) METHOD OF PREPARING FREE POLYELECTROLYTE MEMBRANES

(75) Inventors: Joseph B. Schlenoff, Tallahassee, FL (US); Stephen T. Dubas, Marseilles (FR)

(73) Assignee: Florida State University Research Foundation, Inc., Tallahassee, FL (US)

( * ) Notice: Subject to any disclaimer, the term of this patent is extended or adjusted under 35 U.S.C. 154(b) by 416 days.

(21) Appl. No.: 10/475,236

(22) PCT Filed: Apr. 16, 2002

(86) PCT No.: PCT/US02/11917

§ 371 (c)(1),
(2), (4) Date: Mar. 18, 2004

(87) PCT Pub. No.: WO02/085500

PCT Pub. Date: Oct. 31, 2002

(65) Prior Publication Data

US 2004/0149572 A1 Aug. 5, 2004

(51) Int. Cl.
*B01D 35/06* (2006.01)
*B01D 61/14* (2006.01)
*B01D 61/44* (2006.01)

(52) U.S. Cl. .................. 204/633; 204/634; 204/523; 204/527; 204/296; 204/418; 427/421.1; 427/427.4; 427/402

(58) Field of Classification Search ................ 204/296, 204/523, 527, 634, 633, 418; 427/421.1, 427/427.4, 402

See application file for complete search history.

(56) References Cited

U.S. PATENT DOCUMENTS

| 3,069,728 | A | 12/1962 | Mindick et al. |
| 6,194,474 | B1 | 2/2001 | Kerres et al. |
| 2002/0053514 | A1* | 5/2002 | Locascio et al. ............ 204/454 |
| 2003/0124368 | A1 | 7/2003 | Lynn et al. |

FOREIGN PATENT DOCUMENTS

GB 1187124 4/1970

OTHER PUBLICATIONS

PCT International Search Report dated Aug. 13, 2002.

* cited by examiner

*Primary Examiner*—Bruce F. Bell
(74) *Attorney, Agent, or Firm*—Senniger Powers

(57) ABSTRACT

A releaseable membrane structure for producing a free membrane containing a substrate, a release stratum on the substrate and a membrane stratum on the release stratum. The release stratum and the membrane stratum contain oppositely-charged polyelectrolytes that are associated. The oppositely-charged polyelectrolytes of the release stratum are selected to dissociate upon application of stimulus whereas those of the membrane stratum are selected to remain associated upon application of the stimulus. Thus, when the stimulus is applied the polyelectrolytes in release stratum dissociate and the membrane stratum is released from the substrate and is a free membrane.

49 Claims, 4 Drawing Sheets

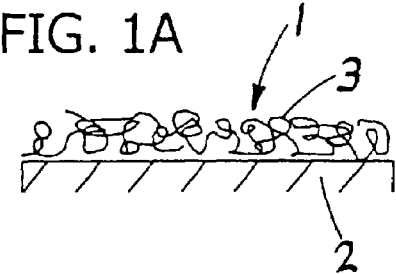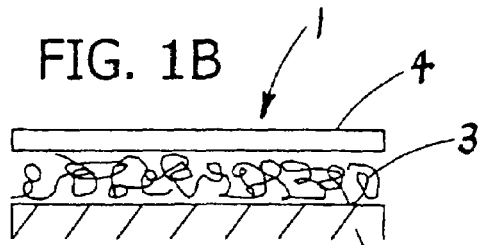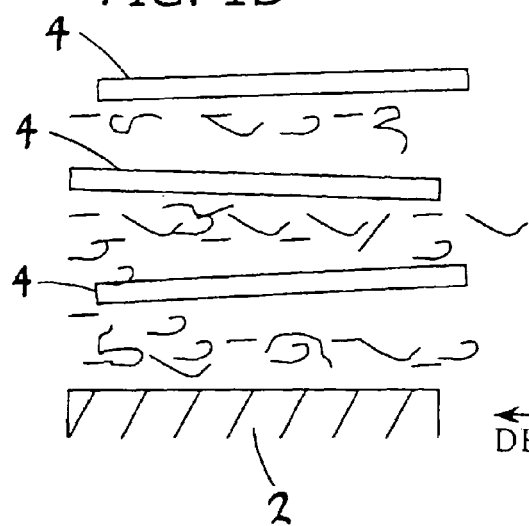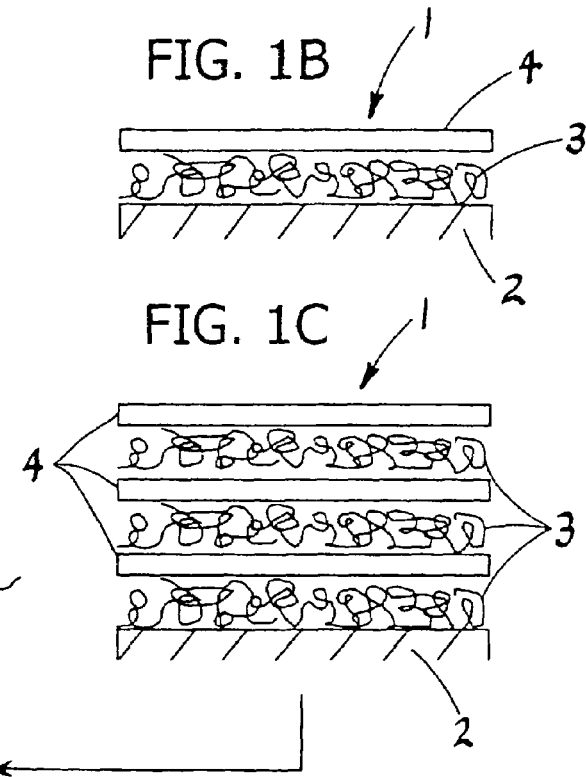

FIG. 2
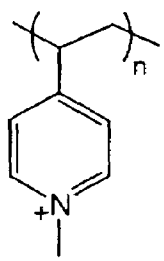
PNM4VP
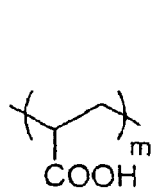
PAA
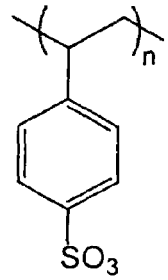
PSS
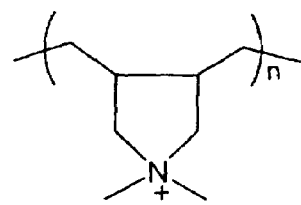
PDADMA
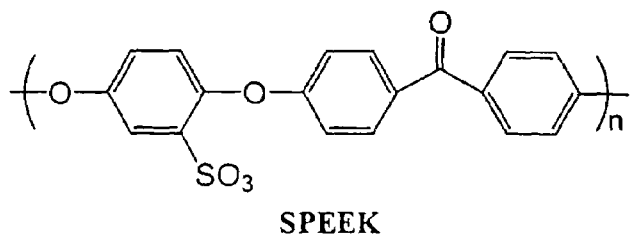
SPEEK
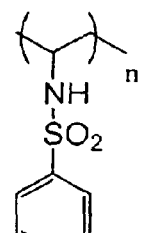
PAZO
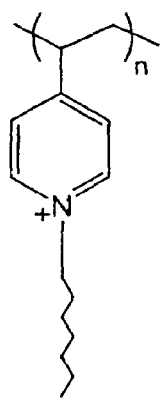
PNO4VP
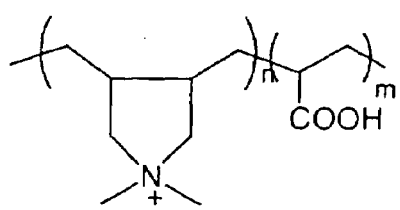
PDAD-co-PAA
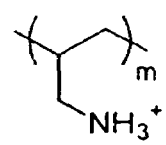
PAH ● PSS/PDAD MEMBRANE DEPOSITED ON P+ ELECTRODE
○ PSS/PDAD FREE MEMBRANE PLACED ON P+ ELECTRODE
■ SPEEK/PDAD MEMBRANE DEPOSITED ON P+ ELECTRODE
◇ SPEEK/PDAD FREE MEMBRANE PLACED ON P+ ELECTRODE

METHOD OF PREPARING FREE POLYELECTROLYTE MEMBRANES

STATEMENT REGARDING FEDERALLY SPONSORED RESEARCH OR DEVELOPMENT

This invention was made with Government support under grant number DMR 9727717 awarded by the National Science Foundation. The Government has certain rights in this invention.

BACKGROUND OF THE INVENTION

The present invention relates generally to a method of preparing thin, continuous, isolated polymer membranes and their use in medical wound dressing and membranes for separations.

Thin polymer films are widely used in industry and medicine. For example, in separations, as anticorrosion coatings, as antistatic coatings, in microelectronic, for lubrication, for biocompatibilization, for dialysis, and as sterile barriers.

Typically, thin polymer films are prepared using charged polymers, or polyelectrolytes, which are alternately deposited on a substrate. Specifically, a buildup of multilayers is accomplished by dipping, i.e., cycling a substrate between two reservoirs containing aqueous solutions of polyelectrolytes of opposite charge, with a rinse step in pure water following each immersion. Each cycle adds a layer of polymer via electrostatic forces to the oppositely-charged surface and reverses the surface charge thereby priming the film for the addition of the next layer. Films prepared in this manner tend to be uniform, follow the contours and irregularities of the substrate and have thicknesses of about 10 to about 10,000 nm. The thickness of the films depends on many factors, including the number of layers deposited, the ionic strength of the solutions, the types of polymers, the deposition time and the solvent used. Although studies have shown that the substantial interpenetration of the individual polymer layers results in little composition variation over the thickness of the film, these polymer thin films are, nevertheless, termed polyelectrolyte multilayers ("PEMs").

Though recently developed, PEMs are widely used in several fields, including light emitting devices, nonlinear optics, sensors, enzyme active thin films, electrochromics, conductive coatings, patterning, analytical separations, anti-corrosion coatings, antistatic coatings, lubricating films, biocompatibilization, dialysis, and as selective membranes for the separation of gasses and dissolved species. PEMs are particularly suited for use as selective membranes because they are uniform, rugged, easily prepared on a variety of substrates, continuous, resistant to protein adsorption, have reproducible thicknesses, can be made very thin to allow high permeation rates and can be made from a wide range of compositions.

Although PEMs are widely used, certain limitations on their use have been imposed by the requirement that they be fabricated on a porous support. For example, the thickness of the films are somewhat inhomogeneous, with areas over the substrate's pores being thinner than the surrounding membrane. Furthermore, if separation from the support is desired, it is advantageous to separate a membrane from its support in an efficient manner. One method for separating a support and membrane is by dissolving the support in an organic solvent. For example, a cellulose acetate support may be dissolved with acetone to remove it from a multilayer comprising charged particles and polymers. See Mamedov and Kotov, Langmuir, 16, 5530 (2000). This process, however, is slow, requires disposal of organic solvents, destroys the substrate, may be difficult or impossible to employ on a multilayer membrane which does not contain charged particles and may denature, or deactivate, biologically-derived species (e.g., enzymes) incorporated within the membrane. Thus, a need continues to exist for a method of creating polyelectrolyte multilayer films which can be quickly and easily separated from their substrates without damaging the membranes or elements within the membranes, without destroying the substrates and without creating a waste stream of organic solvents.

BRIEF SUMMARY OF THE INVENTION

Among the objects and features of the present invention, therefore, is the provision of a releaseable membrane structure; the provision of a process for releasing a membrane from a substrate without damaging or destroying the substrate; the provision of a method for preparing a releaseable membrane structure; the provision of a method of freeing a polymer membrane that is quick and does not require the use of hazardous chemicals; the provision of a process of preparing a releaseable membrane structure by spraying alternating layers of oppositely-charged polyelectrolyte solutions; and the provision of a releaseable membrane structure for medical applications.

Briefly, therefore, the present invention is directed to releaseable membrane structure for producing a free membrane, the releaseable membrane structure comprising:

a substrate;

a release stratum having a front surface and a back surface, the back surface being adsorbed to a surface of the substrate, the release stratum comprising a positively-charged release polyelectrolyte and a negatively-charged release polyelectrolyte which are associated, the positively-charge release polyelectrolyte and the negatively-charged release polyelectrolyte being selected to dissociate upon application of a stimulus; and a membrane stratum adsorbed to the front surface of the release stratum, the membrane stratum comprising a positively-charged membrane polyelectrolyte and a negatively-charged membrane polyelectrolyte which are associated, the positively-charged membrane polyelectrolyte and the negatively-charged membrane polyelectrolyte being selected remain associated upon application of the stimulus.

The present invention is also directed to a method for preparing a releaseable membrane structure, the method comprising:

a. providing a substrate having a surface capable of adsorbing a polyelectrolyte;

b. forming a release stratum on the surface of the substrate that decomposes upon application of a stimulus, the release stratum being formed by a method comprising:

i. applying a first release solution comprising a first release polyelectrolyte onto the substrate whereby the first release polyelectrolyte in the first release solution is adsorbed onto the surface of the substrate to form a first release layer comprising the first release polyelectrolyte;

ii. applying a second release solution comprising a second release polyelectrolyte that is oppositely-charged from the first release polyelectrolyte whereby the second release polyelectrolyte is adsorbed onto first release layer to form a second release layer comprising the second release polyelectrolyte; and iii. performing steps b.i and b.ii until the desired number of first and second release layers are formed; and c. forming a membrane stratum that remains intact upon application of the stimulus on the surface of the release stratum, the membrane stratum being formed by a method comprising:

i. applying a first membrane solution comprising a first membrane polyelectrolyte onto the surface of the release stratum whereby the first membrane polyelectrolyte in the first membrane solution is adsorbed onto the surface of the release stratum to form a first membrane layer comprising the first membrane polyelectrolyte;

ii. applying a second membrane solution comprising a second membrane polyelectrolyte that is oppositely-charged from the first membrane polyelectrolyte whereby the second membrane polyelectrolyte is adsorbed onto first membrane layer to form a second membrane layer comprising the second membrane polyelectrolyte; and iii. performing steps c.i and c.ii until the desired number of first and second membrane layers are formed.

Additionally, the present invention is directed to a method of preparing a free membrane, the method comprising:

a. providing a substrate having a surface capable of adsorbing a polyelectrolyte;

b. forming a release stratum on the surface of the substrate that delaminates upon application of a stimulus, the release stratum being formed by a method comprising:

i. applying a first release solution comprising a first release polyelectrolyte onto the substrate whereby the first release polyelectrolyte in the first release solution is adsorbed onto the surface of the substrate to form a first release layer comprising the first release polyelectrolyte;

ii. applying a second release solution comprising a second release polyelectrolyte that is oppositely-charged from the first release polyelectrolyte whereby the second release polyelectrolyte is adsorbed onto first release layer to form a second release layer comprising the second release polyelectrolyte; and iii. performing steps b.i and b.ii until the desired number of first and second release layers are formed; and c. forming a membrane stratum that remains intact upon application of the stimulus on the surface of the release stratum, the membrane stratum being formed by a method comprising:

i. applying a first membrane solution comprising a first membrane polyelectrolyte onto the surface of the release stratum whereby the first membrane polyelectrolyte in the first membrane solution is adsorbed onto the surface of the release stratum to form a first membrane layer comprising the first membrane polyelectrolyte;

ii. applying a second membrane solution comprising a second membrane polyelectrolyte that is oppositely-charged from the first membrane polyelectrolyte whereby the second membrane polyelectrolyte is adsorbed onto first membrane layer to form a second membrane layer comprising the second membrane polyelectrolyte; and iii. performing steps c.i and c.ii until the desired number of first and second membrane layers are formed; and d. applying the stimulus to delaminate the release layer thereby freeing the membrane layer from the substrate.

Further, the present invention is directed to a method of freeing a membrane stratum from a substrate, the method comprising:

a. providing a releaseable membrane structure comprising:

i. the substrate;

ii. a release stratum having a front surface and a back surface, the back surface being adsorbed to a surface of the substrate, the release stratum comprising a positively-charged release polyelectrolyte and a negatively-charged release polyelectrolyte which are associated, the positively-charge release polyelectrolyte and the negatively-charged release polyelectrolyte being selected to dissociate upon application of a stimulus; and iii. the membrane stratum adsorbed to the front surface of the release stratum, the membrane stratum comprising a positively-charged membrane polyelectrolyte and a negatively-charged membrane polyelectrolyte which are associated, the positively-charged membrane polyelectrolyte and the negatively-charged membrane polyelectrolyte being selected to remain associated upon application of the stimulus; and b. applying the stimulus to dissociate the release stratum thereby freeing the membrane stratum from the substrate.

Other objects will be in part apparent and in part pointed out hereinafter.

BRIEF DESCRIPTION OF THE DRAWINGS

FIG. 1 depicts a releaseable membrane structure of the present invention.

FIG. 2 contains the chemical drawings of several of the polyelectrolytes described herein.

DETAILED DESCRIPTION OF THE INVENTION

Figure 3:
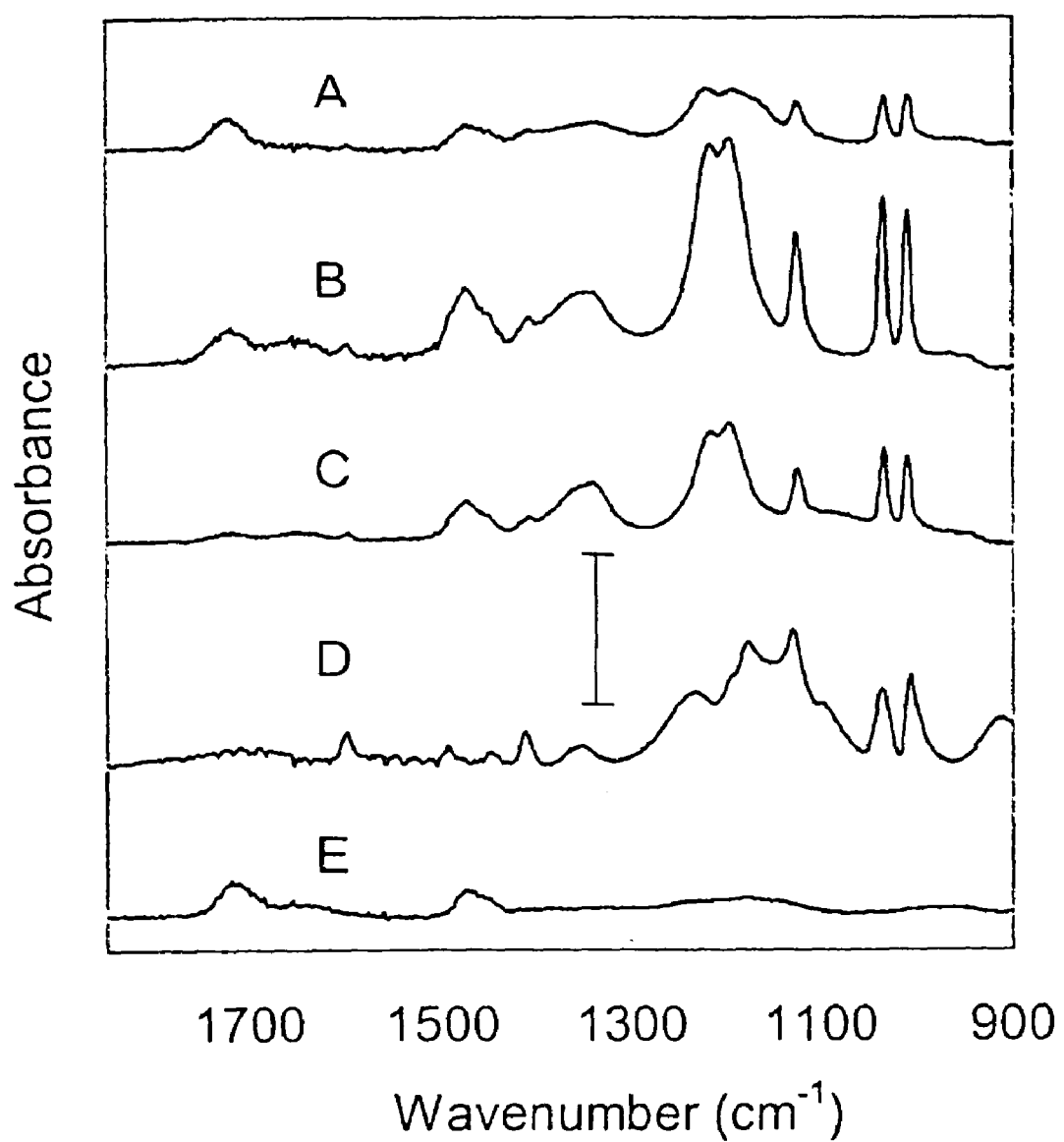
FIG. 3 is FTIR transmission spectra of: (A) 10 layer pairs of PSS/PDAD-co-PAA deposited on a silicon wafer using a 1M NaCl solvent having a pH of 2; (B) is the multilayer of A plus 10 layer pairs of PSS/PDAD deposited using a 1M NaCl solvent having a pH of 2; (C) is membrane B delaminated from the silicon substrate by decomposing A in pH 11 solution, captured on a silicon wafer substrate and exposed to an HCl solution having a pH of 2; (D) is the spectrum a PSS film; and (E) is the spectrum of a PDAD-co-PM film.

In general, the present invention is directed to the preparation of an isolated and free standing multilayer polymer structures, or membranes. The isolated membranes are produced by using a so called "release stratum" that has a composition that is different from the remainder of the membrane, the release stratum is designed to decompose, dissociate or become weakly associated under certain conditions (e.g., a change in salt concentration, pH and/or temperature) thereby freeing the membrane from a substrate.

Referring to FIG. 1A, a releaseable membrane structure 1 for producing a free membrane comprises a substrate or support 2 and a release stratum 3 deposited on the substrate as depicted. Referring to FIG. 1B, a membrane stratum 4 is deposited on the release stratum 3. The time and cost associated with preparing the free membranes of the present invention may be decreased by depositing multiple membrane stratum 4 on the substrate 2 each being separated by a release stratum 3 as depicted in FIG. 1C. In turn, each stratum comprises at least two oppositely-charged polyelectrolytes and is preferably a laminate of alternating oppositely-charged polyelectrolytes applied as layers. Due to the extensive interpenetration of neighboring oppositely-charge polyelectrolyte amongst the layers, each stratum is preferably at least several layers of thick (e.g., at least about 6 oppositely-charged polyelectrolyte layers and more preferably at least about 10 oppositely-charged polyelectrolyte layers). Selective decomposition of the oppositely-charged polyelectrolytes of the release strata affords controlled separation of high quality free membranes 4 as depicted in FIG. 1D.

The polyelectrolyte solutions comprise a soluble charged polymer (i.e., a polyelectrolyte). The molecular weight of synthetic polyelectrolyte molecules is typically about 1,000 to about 5,000,000 grams/mole, and preferably about 10,000 to about 1,000,000 grams/mole. The molecular weight of naturally occurring polyelectrolyte molecules (i.e., charged biomolecules), however, can reach as high as 10,000,000 grams/mole. The polyelectrolyte typically comprises about 0.01% to about 40% by weight of the polyelectrolyte solution, and preferably about 0.1% to about 10% by weight.

The polyelectrolytes of the present invention are charged polymers, preferably water soluble, which comprise a monomer unit that is positively or negatively charged. The polyelectrolytes used in the present invention may be copolymers that have a combination of charged and/or neutral monomers (e.g., positive and neutral; negative and neutral; positive and negative; or positive, negative and neutral). Regardless of the exact combination of charged and neutral monomers, a polyelectrolyte of the present invention is predominantly positively-charged or predominantly-negatively charged and hereinafter is referred to as a "positively-charged polyelectrolyte" or a "negatively-charged polyelectrolyte," respectively.

Alternatively, the polyelectrolytes can be described in terms of the average charge per repeat unit in a polymer chain. For example, a copolymer composed of 100 neutral and 300 positively-charged repeat units has an average charge of 0.75 (3 out of 4 units, on average, are positively-charged). As another example, a polymer that has 100 neutral, 100 negatively-charged and 300 positively-charged repeat units would have an average charge of 0.4 (100 negatively-charged units cancel 100 positively-charged units leaving 200 positively-charged units out of a total of 500 units). Thus, a positively-charged polyelectrolyte has an average charge per repeat unit between 0 and 1. An example of a positively-charged copolymer is PDAD-co-PAC (i.e., poly(diallyldimethylammonium chloride) and polyacrylamide copolymer)—the PDAD units have a charge of 1 and the PAC units are neutral so the average charge per repeat unit is less than 1. Similarly, a negatively-charged polyelectrolyte has an average charge per repeat unit between 0 and −1.

The charges on a polyelectrolyte may be derived directly from the monomer units or they may be introduced by chemical reactions on a precursor polymer. For example, PDAD is made by polymerizing diallyldimethylammonium chloride, a positively charged water soluble vinyl monomer. PDAD-co-PAC is made by the polymerization of diallyldimethylammonium chloride and acrylamide (a neutral monomer which remains neutral in the polymer). Poly(styrenesulfonic acid) is often made by the sulfonation of neutral polystyrene. Poly(styrenesulfonic acid) can also be made by polymerizing the negatively charged styrene sulfonate monomer. The chemical modification of precursor polymers to produce charged polymers may be incomplete and result in an average charge per repeat unit that is less than 1.0. For example, if only about 80% of the styrene repeat units of polystyrene are sulfonated, the resulting poly(stryrenesulfonic acid) has an average charge per repeat unit of about −0.8.

Examples of a negatively-charged polyelectrolyte include polyelectrolytes comprising a sulfonate group ($-SO_3^-$), such as poly(styrenesulfonic acid)("PSS"), poly(2-acrylamido-2-methyl-1-propane sulfonic acid)("PAM PS"), sulfonated poly (ether ether ketone)(SPEEK), sulfonated lignin, poly(ethylenesulfonic acid), poly (methacryloxyethylsulfonic acid), their salts, and copolymers thereof; polycarboxylates such as poly(acrylic acid)("PM") and poly(methacrylic acid); and sulfates such as carragenin. Examples of a positively-charged polyelectrolyte include polyelectrolytes comprising a quaternary ammonium group, such as poly(diallyldimethylammonium chloride)("PDAD"), poly(vinylbenzyltrimethylammonium) ("PVBTA"), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group, such as, poly(N-methylvinylpyridine)("PMVP"), other poly(N-alkylvinylpyridines), and copolymers thereof; and protonated polyamines such as poly(allylaminehydrochloride) ("PAH"). Chemical drawings of some of the above polyelectrolytes are depicted in FIG. 2.

The polyelectrolytes used in the method of the present invention have very low toxicity. In fact, poly(diallyidimethylammonium chloride), poly(2-acrylamido-2-methyl-1-propane sulfonic acid) and their copolymers are used in the personal care industry, e.g., in shampoos. Also, because the polyelectrolytes used in the method of the present invention are synthetic or synthetically modified natural polymers, their properties (e.g., charge density, viscosity, water solubility and response to pH) may be finely tailored by adjusting their composition.

Preferably, the polyelectrolytes strongly dissociate in the selected solvent (e.g., water). Polyelectrolytes which strongly dissociate are polymers with charged polymer segments that are not weak acids, protonated forms of weak bases, or the salts of weak acids (e.g., polymers that have primary, secondary or tertiary amines, such as polyallylamine and polyethyleneimine; and carboxylates, such as poly(acrylic acid) and poly(methacrylic acid). Typically, strongly dissociating polyelectrolytes comprise the sulfonate monomer group, the quaternary ammonium monomer group, the pyridinium monomer group, the phosphonium monomer group or the sulfate monomer group. Preferred negatively-charged polyelectrolytes include poly(styrenesulfonic acid), poly(2-acrylamido-2-methyl-1-propane sulfonic acid), sulfonated lignin, poly(ethylenesulfonic acid), poly(methacryloxyethylsulfonic acid), sulfonated poly (ether ether ketone) and poly(acrylic acid). Preferred positively-charged polyelectrolytes include poly(diallyldimethylammonium chloride)("PDAD"), poly(vinylbenzyltrimethylammonium)("PVBTA"), ionenes, poly (acryloxyethyltrimethyl ammonium chloride), poly (methacryloxy(2-hydroxy)propyltrimethyl ammonium chloride), poly(N-methylvinylpyridine)("PMVP"), other poly(N-alkylvinylpyridines), and poly(allylaminehydrochloride) ("PAH").

Further examples of oppositely-charged polyelectrolytes include charged biomacromolecules which are naturally occurring polyelectrolytes or their charged derivatives. A positively-charged biomacromolecule comprises a protonated sub-unit (e.g., protonated amines) and some negatively-charged biomacromolecules comprise a deprotonated sub-unit (e.g., deprotonated carboxylates). Accordingly, charged biomacromolecules are typically considered to weakly dissociate. Examples of biomolecules which can be charged and used in accordance with the present invention include proteins, polypeptides, enzymes, DNA, RNA, heparin, alginic acid, chondroitin sulfate, chitosan, chitosan sulfate, cellulose sulfate, polysaccharides, dextran sulfate and carboxymethylcellulose.

Optionally, the polyelectrolyte solutions may comprise one or more "salts." A "salt" is defined as a soluble, ionic, inorganic compound that dissociates to stable ions (e.g., sodium chloride). A salt is included in the polyelectrolyte solutions to control the thickness of the adsorbed layers. More specifically, including a salt increases the thickness of the adsorbed polyelectrolyte layer. In general increasing the salt concentration increases the thickness of the layer for a given spray coverage and contact time. This phenomenon is limited, however, by the fact that upon reaching a sufficient salt concentration multilayers tend to dissociate. Typically, the amount of salt added to the polyelectrolyte solution is about 10% by weight or less.

By definition, a polyelectrolyte solution comprises a solvent. An appropriate solvent is one in which the selected polyelectrolyte and, if desired, the salt are soluble. Thus, the appropriate solvent is dependent upon whether the polyelectrolyte is considered to be hydrophobic or hydrophilic. A hydrophobic polymer displays a less favorable interaction energy with water than a hydrophilic polymer. While a hydrophilic polymer is water soluble, a hydrophobic polymer may only be sparingly soluble in water, or, more likely insoluble in water. Likewise, a hydrophobic polymer is more likely to be soluble in organic solvents than a hydrophilic polymer. In general, the higher the carbon to charge ratio of the polymer, the more hydrophobic it tends to be. For example, polyvinyl pyridine alkylated with a methyl group ("PNM4VP") is considered to be hydrophilic, whereas polyvinyl pyridine alkylated with an octyl group ("PNO4VP") is considered to be hydrophobic. Thus, water is preferably used as the solvent for hydrophilic polyelectrolytes and organic solvents such as alcohols (e.g., ethanol) are preferably used for hydrophobic polyelectrolytes.

The polyelectrolyte solutions may be deposited on the substrate by any appropriated method such as dipping and/or spraying. Nevertheless, they are preferably sprayed onto the substrate by any applicable means (e.g., an atomizer, an aspirator, ultrasonic vapor generator, entrainment in compressed gas). In fact, a hand operated "plant mister" has been used to spray the polyelectrolyte solutions. Typically, the droplet size in the spray is about 10 nm to about 1 mm in diameter. Preferably, the droplet size is about 10 µm to 100 µm in diameter. The coverage of the spray is typically about 0.001 to 1 mL/cm$^2$, and preferably about 0.01 to 0.1 mL/cm$^2$.

The duration in which the polyelectrolyte solution is typically in contact with the surface it is sprayed upon (i.e., the contact time) varies from a couple seconds to several minutes to achieve a maximum, or steady-state, thickness. The contact duration is selected based on the desired relationship between throughput (i.e., the rate at which alternating layers are created) and layer thickness. Specifically, decreasing the contact duration increases throughput and decreases layer thickness whereas increasing the duration decreases throughput and increases thickness. Preferably, the contact time is selected to maximize the throughput of layers that have a satisfactory thickness and are uniform across the surface (e.g., an average thickness of about 130 nm±1.7% or 140 nm±1.5%). Experimental results to date indicate a contact time of about 10 seconds provides a satisfactory thickness.

The oppositely-charged polyelectrolyte solutions can be sprayed immediately after each other, however, experimental results to date indicate that the films, though thicker, are of poorer quality (e.g., blobs, poor adhesion, and non-uniform film thickness). Additionally, the composition of deposited layers depends precisely on the amount of spray that impinges on the substrate and can lead to non-stoichiometric (the ratio is not controlled) complexes. Including an intermediate rinse step between the spraying of the oppositely-charged polyelectrolyte solutions, however, rinses off excess, non-bonded, polyelectrolyte and decreases, or eliminates, the formation of blobs, poor adhesion and non-uniform film thickness. Rinsing between the application of each polyelectrolyte solution also results in stoichiometric complexes. The rinsing liquid comprises an appropriate solvent (e.g., water or organic solvent such as alcohol). Preferably the solvent is water. If the solvent is inorganic (e.g., water), the rinsing liquid may also comprise an organic modifier (e.g., ethanol, methanol or propanol). The concentration of organic modifier can be as high as less than 100 percent by weight of the rinsing liquid, but is preferably less than about 50 percent by weight. The rinsing liquid may also comprise a salt (e.g., sodium chloride) which is soluble in the solvent and the organic modifier, if included in the rinsing liquid. The concentration of salt is preferably below about 10 percent by weight of the rinsing liquid. It should be noted that as the concentration of organic modifier increases the maximum solubility concentration of salt decreases. The rinsing liquid, however, must not comprise a polyelectrolyte. The rinsing step may be accomplished by any appropriate means (e.g., dipping or spraying). Preferably, the rinsing step is accomplished by spraying. Although rinsing removes much of the polymer in the layer of liquid wetting the surface, the amount of waste is preferably reduced by recycling the polymer solutions removed from the surface.

Optionally, prior to depositing the second through n$^{th}$ layer of sprayed oppositely-charged polyelectrolyte solution, the surface of the multilayer structure may be dried.

The following table sets forth an exemplary list dissociation stimuli for oppositely-charged multilayer combinations.

TABLE A

| Negatively-charged Polyelectrolyte | Positively-charged Polyelectrolyte | Dissociation Stimulus |
|---|---|---|
| PSS | PDAD | NaCl solution ≧ about 3.5 M |
| PAA | PDAD | NaCl solution ≧ about 0.6 M |
| PSS | PDAD-co-PAA | solution having a pH ≧ 6 |
| SPEEK | PDAD | NaCl ≧ 2.0 M |
| PSS | PMVP | NaCl ≧ 4.0 M |
| polyglutamic acid | polylysine | NaCl ≧ 4.0 M |
| PSS | PNO4VP | NaCl ≧ 2.5 M |
| PSS | PNM4VP | NaCl ≧ 2.5 M |
| PSS | PDAD | LiCl ≧ 2.5 M |

TABLE A-continued

| Negatively-charged Polyelectrolyte | Positively-charged Polyelectrolyte | Dissociation Stimulus |
|---|---|---|
| PSS | PDAD | NaBr $\geq$ 1.5 M |
| PSS | PDAD | LiClO$_4$ $\geq$ 1.0 M |
| PSS | PDAD | NaClO$_4$ $\geq$ 0.75 M |
| PSS | PDAD | MgCl$_2$ $\geq$ 1.5 M |
| PSS | PDAD | CaCl$_2$ $\geq$ 1.3 M |
| PSS | PDAD | YCl$_3$ $\geq$ 1.5 M |
| PSS | PDAD | NaNO$_3$ $\geq$ 3.5 M |
| PSS | PDAD | HClO$_4$ 1.5 M |
| PSS | PDAD | HCl $\geq$ 1.5 M |
| PSS | PDAD | RbCl $\geq$ 2.8 M |

Thus, based on the desired polyelectrolyte free membrane the appropriate oppositely-charged polyelectrolytes may be selected to create a release stratum that decomposes, dissociates or becomes weakly associated under conditions which do not negatively impact the integrity of the free membrane.

The above-described sequential adsorption technique for producing polymer membranes permits a wide variety of additives to be incorporated into the multilayers as they are formed. Additives that may be incorporated into polyelectrolyte multilayers include inorganic materials such as metallic oxide particles (e.g., silicon dioxide, aluminum oxide, titanium dioxide, iron oxide, zirconium oxide and vanadium oxide), clay minerals (e.g., hectorite, kaolin, laponite and montmorillonite) and metal colloids (e.g., gold, silver, platinum, palladium, iron, nickel and alloys thereof), and semiconductor nanoparticles (e.g., cadmium sulfide, cadmium selenide, zinc sulfide, zinc selenide and indium phosphide). When immersed in the solvent of the polyelectrolyte solutions, such additives take on a charge which is typically negative. More precisely, when an insoluble solid is contacted with a liquid medium, an electric double layer forms at the solid-liquid interface. The electric double layer comprises an array of either positive or negative ions attached to, or adsorbed on, the surface of the solid and a diffuse layer of ions of opposite charge surrounding the charged surface of the solid and extending into the liquid medium. The electric potential across the electric double layer is known as the zeta potential. Both the magnitude and polarity of the zeta potential for a particular solid-liquid system will tend to vary depending on the composition of the solid surface and the liquid, as well as other factors, including the size of the solid and the temperature and pH of the liquid. Although the polarity of the zeta potential may vary from one particle to another within a suspension of solid particles in a liquid, the polarity of the zeta potential for the suspension as a whole is characterized by the polarity of the surface charge attached to a predominant number of solid particles within the suspension. That is, a majority of the insoluble particles in the suspension will have either a positive or negative surface charge. The magnitude and polarity of the zeta potential for a suspension of solid particles in a liquid is calculated from the electrophoretic mobilities (i.e., the rates at which solid particles travel between charged electrodes placed in the suspension) and can be readily determined using commercially available microelectrophoresis apparatus. If present, the concentration of inorganic materials preferably does not exceed about 10% by weight of a polyelectrolyte solution and more preferably the concentration is between about 0.01% and about 1% by weight of the polyelectrolyte solution.

Surface active ions are a further example of an additive which may be included in the multilayers. Examples of surface active ionic materials include soaps and surfactants such as sodium stearate, stearic acid, sodium dodecyl sulfate, and quaternary alkyl ammoniums. The surface active materials readily take on a positive or negative charge when introduced into a polyelectrolyte solution (e.g., alkyl sulfate ions have a negative charge and alkyl ammonium ions have a positive charge). In addition to being charged, surface active ions are readily incorporated into polyelectrolyte multilayers because they tend to be more hydrophobic than many polyelectrolytes and thus are more likely to be incorporated in a deposited polyelectrolyte layer than to remain in solution. If present, the concentration of surface active ions preferably does not exceed about 10% by weight of a polyelectrolyte solution and more preferably the concentration is between about 0.01% and about 1% by weight of the polyelectrolyte solution.

The polymer membranes of the present invention are particularly suited for use as a medical dressing in which the free membrane, upon being released from the substrate, has several advantages such as flexibility, permeability to oxygen, water content, low toxicity and acts as a barrier against the flow of blood, other bodily fluids, pathogens such as bacteria and virus. As such, the membranes may comprise an additive which promote wound healing and/or inhibit infection, i.e., a medicinal material such as an antibiotic, an antiviral, an antifungal, a coagulant, a steroid, a biocompatibilizer, a sterilizer, an anticoagulant or any other desirable medication and mixtures thereof. Such medicinal materials may be incorporated directly into the polyelectrolyte solution and/or introduced as encapsulated particles. Medicinal materials directly incorporated into a polyelectrolyte solution may take on a positive or a negative charge but typically a negative charge and are therefore more likely to be added to polyelectrolyte solutions which comprise a negatively-charged polyelectrolyte. Encapsulated medicinal materials may be encapsulated with a polyelectrolyte multilayer, and as such, the outermost layer can be selected to provide a positive or negative charge.

In another preferred embodiment of the present invention, the releaseable membrane structure comprises a substrate that is flexible which allows a substantial portion of the releaseable membrane structure's surface area (e.g., greater than 50%) to be placed in contact with a surface that is not flat. Flexible substrate materials include, for example, polymeric and/or elastomeric materials such as polyethylene; polypropylene; polystyrene; cellulosics (polymers of cellulose); polyesters such as polyethylene teraphthalate (MYLAR film available from Du Pont); polybutadiene; polyisoprene; polyvinylchloride; and polyurethane. To separate the membrane from the substrate, the area that is to be covered by the membrane may, for example, be sprayed with a solution and/or the temperature of the area may be increased in order to decompose the release stratum. The membrane is placed in contact with the area to be covered and the decomposition stimulus causes the release stratum to decompose which separates the membrane from the flexible substrate and leaves the membrane on the contact surface.

Further, the crosslinking of associated polyelectrolyte can be enhanced and or increased by heating and/or irradiating (e.g., UV light) the releasable membrane structure. Typically, improving crosslinking is considered advantageous within membrane strata and disadvantageous within release strata.

The present invention is further illustrated by the following examples which are merely for the purposes of illustration and are not to be regarded as limiting the scope of the invention or manner in which it may be practiced.

EXAMPLE 1

This example describes the use of an increase in salt concentration as the dissociation stimulus. It is presently believed that increasing the salt concentration decomposes a release stratum by: 1) swelling the stratum with the salt ions and accompanying water; and 2) disrupting the attractive forces between the charged polyelectrolyte layers because the polyelectrolyte layers become attracted to oppositely-charged salt ions rather than the oppositely-charged polyelectrolyte of the surrounding layers. See Dubas and Schlenoff, Langmuir 17, 7725 (2001).

A multilayer comprising 20 alternating layers of PAA and PDAD (i.e., the release stratum) was deposited on top of and in contact with a silicon wafer substrate with a surface area about 600 cm$^2$. A second multilayer comprising 20 alternating layers of PSS and PDAD (i.e., the membrane stratum) was deposited on top of and in contact with the release stratum. The thickness of the PAA/PDAD multilayers increases with increasing salt concentrations up to a concentration of about 0.4 M NaCl (up to about 200 nm per 20 layers) Above about 0.4 M NaCl the PAA/PDAD multilayers begin to dissociate/decompose and at concentrations greater than about 0.6 M the PAA/PDAD multilayers are completely separated from the substrate. In contrast, PSS/PDAD multilayers are stable up to a salt concentration of about 3.5 M. Thus, the PSS/PDAD stratum is quickly released from the substrate intact upon immersion in or being contacted with 1 M NaCl.

EXAMPLE 2

A change in the pH can also be used to delaminate the release stratum. For example, the complete removal of a weak polyacid-containing multilayer from a substrate at a low pH by neutralizing the negatively-charged polyelectrolyte to eliminate the electrostatic interaction of the polyelectrolytes has been reported. See Mendelsohn et al., Langmuir 16, 5017 (2000). Additionally; it has been reported that a pH change can destabilize a multilayer created with hydrogen-bonded polymer complexes. See Sukishvili and Granick, J. Am. Chem. Soc. 122, 9550 (2000).

Specifically, this example describes the use of a pH increase as the dissociation stimulus. Using a 1 M NaCl-HCl solution having a pH of about 2, a multilayer comprising 10 alternating layers of random copolymer of PAA (20%) and PDAD (80%), bearing a net positive change (PDAD-co-PM) and PSS as its negative partner was deposited on a silicon wafer substrate with a surface area of about 600 cm$^2$ as the release stratum. At a low pH, less than about pH 6, the PM units are protonated (uncharged). A second multilayer comprising 10 alternating layers of PSS and PDAD (i.e., the membrane stratum) was deposited on the release stratum at less than about 6 pH. Exposure of this releaseable structure to a solution having a pH that is greater than about 6 causes the PM units to ionize, imparting a net negative charge to the release layer, and causing it to dissociate.

FIG. 3 depicts transmission FTIR of the foregoing dissociation scheme. Spectrum A is of the first PSS/PDAD-co-PM stratum. Signals from the sulfonates at about the 960 to about 1210 cm$^{-1}$ region and the C=O stretch of protonated carboxylate at about 1720 cm$^{-1}$ are observed. Spectrum B depicts the enhancement of the sulfonate band after the PSS/PDAD stratum was added (PDAD shows few discernable features in the frequency region presented). After being exposed to a pH of about 11, the PSS/PDAD stratum detached as indicated by Spectrum C. Specifically only approximately 13% (equivalent to 2.6 layers) of the original carboxylic acid intensity is observed in Spectrum C, which is a consequence of interpenetration of the first and second strata. Spectra D and E are of the pure PSS and PDAD-co-PM, respectively.

The use of the copolymer/pH change approach to delaminate the release stratum can be advantageous over the salt concentration change method because the pH change method tolerates higher salt concentrations which allows for the creation of thicker layers. However, when using PAA/PDAD as the release layer, reduction of solution pH to eliminate electrostatic interactions is not as effective as the salt-competition method, because secondary interactions such as hydrogen bonding and hydrophobic forces seem to hold the neutralized PM and PDAD together at all but the lowest pH values (e.g., below about 2 pH). Without being held to a particular theory, it is presently believed that the driving forces for dissociation are entropic in nature. For example, each polymer repeat unit gains about 0.2 kT of configurational entropy when released to the solutions, in addition to the translation entropy of associated salt ions and water molecules. It has been estimated that a minimum charge density of about 20% is required to form stable multilayers. See Hoogeveen, N. G., Cohen-Stuart, M. A. Fleer, G. J., Langmuir 12, 3675 (1996). Thus, the critical point for multilayer decomposition does not require that all polymer/polymer contacts be broken, but a sufficient number (e.g., greater than about 80% of the available charge density) must be negated for the multilayer to surrender to the entropic forces driving dissociation.

EXAMPLE 3

Figure 4:
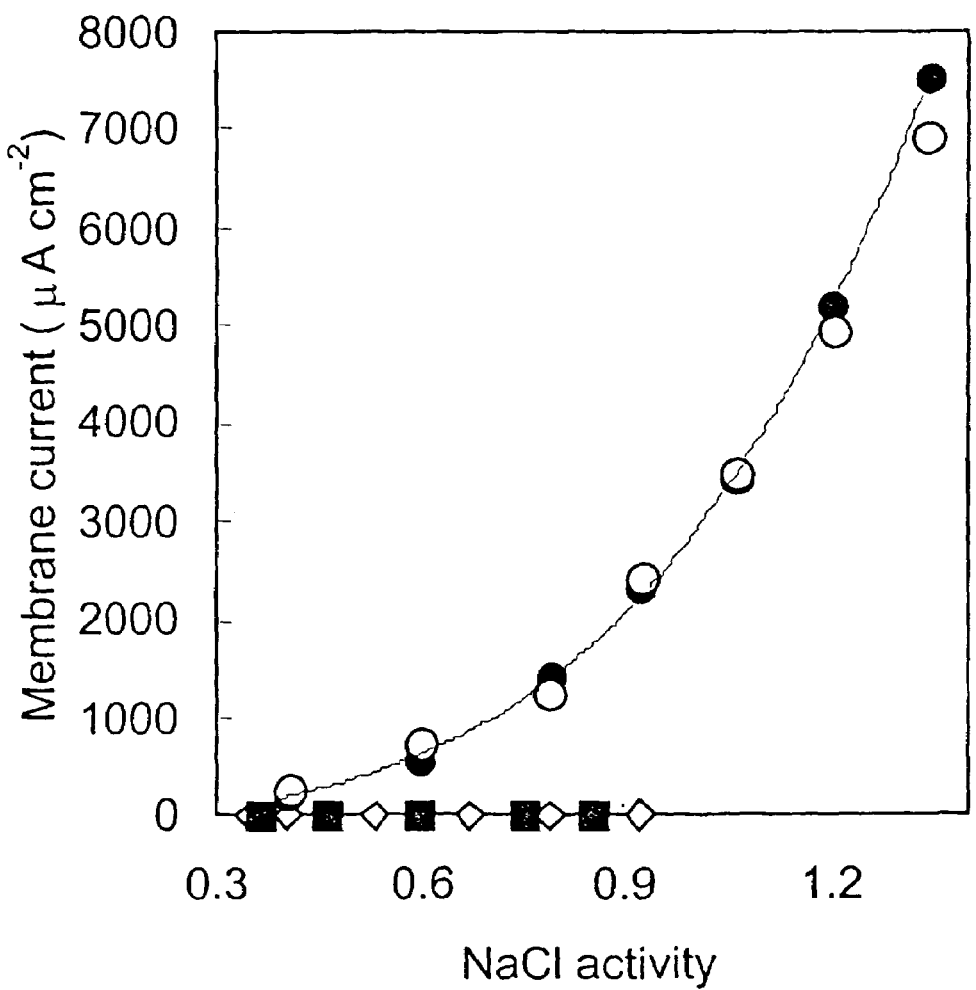
FIG. 4 is the ion flux, as current density, through multilayer membranes on the surface of an electrode as a function of the activity of salt in solution.

The ion transport properties of free membranes and as-deposited membrane strata were compared by measuring the flux of electrochemically active probe ions through them. FIG. 4 compares the current density passing through a 20-layer PSS/PDAD film grown directly on a platinum electrode with the current passing through a 20 layer PSS/PDAD film deposited on a 20 layer PSS/PDAD-co-PM release stratum which was delaminated by immersion in pH 11, 1M NaCl solution and then placed on a platinum electrode. The films had the same nominal thickness (about 200 nm). The open circles represent the 10 layer-pair free membrane of PSS/PDADMA fabricated as in FIG. 1 and tested in FIG. 3. The filled circles represent 10 layer pairs of PSS/PDADMA deposited directly on the electrode surface from 1 M NaCl-polyelectrolyte solutions. Both samples showed the strong nonlinear dependence of ion flux on salt concentration peculiar to these intrinsically compensated systems. For comparison, FIG. 4 also contains the current density of membranes from a more hydrophobic, therefore less permeable, sulfonated poly (ether ether ketone) (SPEEK)/PDAD multilayer. Specifically, the squares represent SPEEK/PDAD deposited on PSS/PDAD-co-PAA at pH 2 and released from the surface at pH 11 and the diamonds represent a SPEEK/PDAD multilayer deposited directly on the electrode. The current density values for a particular membrane composition are the same, within experimental error, whether they are deposited directly on the electrode, or whether they are floated off the surface with a release layer then recaptured on the electrode, indicating that the free membranes were not degraded by the dissociation process and remained pinhole-free.

In view of the above, it will be seen that the several objects of the invention are achieved and other advantageous results attained. It is intended that all matter contained in the above description shall be interpreted as illustrative and not in a limiting sense.

What is claimed is:

1. A releaseable membrane structure for producing a free membrane, the releaseable membrane structure comprising:
a substrate and a releaseable membrane on a surface of the substrate, the releaseable membrane comprising a release stratum and a membrane stratum, wherein (i) the release stratum has a front surface and a back surface, the back surface being adsorbed to the surface of the substrate, the release stratum comprising a positively-charged release polyelectrolyte and a negatively-charged release polyelectrolyte which are associated; (ii) the membrane stratum has a front surface and a back surface, the back surface adsorbed to the front surface of the release stratum, the membrane stratum comprising a positively-charged membrane polyelectrolyte and a negatively-charged membrane polyelectrolyte which are associated; and (iii) the release stratum and the membrane stratum have a different composition whereby upon application of a dissociation stimulus, the release stratum dissociates, but the membrane stratum remains intact and is released from the substrate.

2. The releaseable membrane structure of claim 1 wherein the substrate comprises a polymer.

3. The releaseable membrane structure of claim 2 wherein the polymer is selected from the group consisting of polyethylene, polypropylene, polystyrene, cellulose polymers, polyesters, polybutadiene, polyisoprene, polyvinylchloride, and polyurethane, copolymers and mixtures thereof.

4. The releaseable membrane structure of claim 1 wherein the positively-charged membrane polyelectrolyte and the negatively-charged membrane polyelectrolyte comprise a biomacromolecule.

5. The releaseable membrane structure of claim 4 wherein the biomacromolecule is selected from the group consisting of a protein, a polypeptide, an enzyme, deoxyribonucleic acid, ribonucleic acid, heparin, alginic acid, chondroitin sulfate, chitosan, chitosan sulfate, cellulose sulfate, a polysaccharide, dextran sulfate, carboxymethylcellulose and mixtures thereof.

6. The releaseable membrane structure of claim 1 wherein the membrane stratum comprises an additive selected from the group consisting of an inorganic material, a medicinal material, a surface active ion and mixtures thereof.

7. The releaseable membrane structure of claim 6 wherein the inorganic material is selected from the group consisting of a semiconductor nanoparticles, metallic oxide, a clay mineral, a metal colloid and mixtures thereof.

8. The releaseable membrane structure of claim 7 wherein the semiconductor nanoparticles are selected from the group consisting of cadmium sulfide, cadmium selenide, zinc sulfide, zinc selenide and indium phosphide, the metallic oxide is selected from the group consisting of silicon dioxide, aluminum oxide, titanium dioxide, iron oxide, zirconium oxide, vanadium oxide and mixtures thereof, the clay mineral is selected from the group consisting of hectorite, kaolin, laponite, montmorillonite and mixtures thereof, and the metallic colloid is selected from the group consisting of gold, silver, platinum, palladium, iron, nickel and mixtures thereof.

9. The releaseable membrane structure of claim 6 wherein the medicinal material is selected from the group consisting of an antibiotic, an antiviral, an antifungal, a coagulant, a steroid, a biocompatibilizer, a sterilizer, an anticoagulant and mixtures thereof.

10. The releaseable membrane structure of claim 6 wherein the surface active ion is selected from the group consisting of stearic acid, sodium stearate, sodium dodecyl sulfate, and quaternary alkyl ammoniums.

11. The releaseable membrane structure of claim 1 wherein the release stratum and the membrane stratum comprise a salt.

12. The releaseable membrane structure of claim 11 wherein the salt comprises no more than about 10 percent by weight of the release stratum or the membrane stratum.

13. The releaseable membrane structure of claim 1 comprising a multiplicity of alternating release strata and membrane strata.

14. The releaseable membrane structure of claim 1 wherein the positively-charged release polyelectrolyte and the positively-charged membrane polyelectrolyte have a different composition or the negatively-charged release polyelectrolyte and the negatively charged membrane polyelectrolyte have a different composition.

15. The releaseable membrane structure of claim 1 wherein the release stratum comprises alternating and interpenetrating layers of poly(acrylic acid) and poly(diallyldimethylammonium chloride) and the dissociation stimulus is a solution comprising sodium chloride at a concentration between about 0.6M and 3.5M.

16. The releaseable membrane structure of claim 15 wherein the membrane stratum comprises alternating and interpenetrating layers of poly(styrenesulfonic acid) and poly(diallyldimethylammonium chloride).

17. The releaseable membrane structure of claim 1 wherein the release stratum comprises alternating and interpenetrating layers of poly(styrenesulfonic acid) and a random copolymer of poly(acrylic acid) and poly(diallyldimethylammonium chloride) and the dissociation stimulus is a solution having a pH greater than about 6.0.

18. The releaseable membrane structure of claim 17 wherein the membrane stratum comprises alternating and interpenetrating layers of poly(styrenesulfonic acid) and poly(diallyldimethylammonium chloride).

19. The releaseable membrane structure of claim 17 wherein the membrane stratum comprises alternating and interpenetrating layers of sulfonated poly(ether ether ketone) and poly(diallyldimethylammonium chloride).

20. The releaseable membrane structure of claim 1 wherein the release stratum comprises alternating and interpenetrating layers of poly(styrenesulfonic acid) and poly (diallyldimethylammonium chloride) and the dissociation stimulus is selected from among a solution comprising sodium chloride at a concentration of greater than about 3.5M, a solution comprising lithium chloride at a concentration of greater than about 2.5M, a solution comprising sodium bromide at a concentration of greater than about 1.5M, a solution comprising lithium perchlorate at a concentration of greater than about 1.0M, a solution comprising sodium perchlorate at a concentration of greater than about 0.75M, a solution comprising magnesium chloride at a concentration of greater than about 1.5M, a solution comprising calcium chloride at a concentration of greater than about 1.3M, a solution comprising yttrium chloride at a concentration of greater than about 1.5M, a solution comprising sodium nitrate at a concentration of greater than about 3.5M, a solution comprising perchloric acid at a concentration of greater than about 1.5M, a solution comprising hydrochloric acid at a concentration of greater than about 1.5M, and a solution comprising rubidium perchlorate at a concentration of greater than about 2.8M.

21. The releaseable membrane structure of claim 1 wherein the release stratum comprises alternating and interpenetrating layers of poly(styrenesulfonic acid) and poly(N-octyl-4-vinylpyridine) and the dissociation stimulus is a solution comprising sodium chloride at a concentration greater than about 2.5M.

22. The releaseable membrane structure of claim 1 wherein the release stratum comprises alternating and interpenetrating layers of poly(styrenesulfonic acid) and poly(N-methyl-4-vinylpyridine) and the dissociation stimulus is a solution comprising sodium chloride at a concentration greater than about 2.5M.

23. The releaseable membrane structure of claim 1 wherein the release stratum comprises alternating and interpenetrating layers of sulfonated poly(ether ether ketone) and poly(diallyldimethylammonium chloride) and the dissociation stimulus is a solution comprising sodium chloride at a concentration greater than about 2.0M.

24. The releaseable membrane structure of claim 1 wherein the release stratum comprises alternating and interpenetrating layers of poly(styrenesulfonic acid) and poly(N-methylvinylpyridine) and the dissociation stimulus is a solution comprising sodium chloride at a concentration greater than about 4.0M.

25. The releaseable membrane structure of claim 1 wherein the release stratum comprises alternating and interpenetrating layers of polyglutamic acid and polylysine and the dissociation stimulus is a solution comprising sodium chloride at a concentration greater than about 4.0M.

26. The releaseable membrane structure of claim 1 wherein the membrane stratum comprises alternating and interpenetrating layers of the positively-charged membrane polyelectrolyte and the negatively-charged membrane polyelectrolyte and the release stratum comprises alternating and interpenetrating layers of the positively-charged release polyelectrolyte and the negatively-charged release polyelectrolyte.

27. A method for preparing a releaseable membrane structure, the method comprising:
  a. forming a release stratum on a surface of a substrate that dissociates upon application of a dissociation stimulus, the release stratum being formed by a method comprising:
    i. applying a first release solution comprising a first release polyelectrolyte onto the substrate whereby the first release polyelectrolyte in the first release solution is adsorbed onto the surface of the substrate to form a first release layer comprising the first release polyelectrolyte;
    ii. applying a second release solution comprising a second release polyelectrolyte that is oppositely-charged from the first release polyelectrolyte whereby the second release polyelectrolyte is adsorbed onto first release layer to form a second release layer comprising the second release polyelectrolyte; and
    iii. performing steps a.i and a.ii until the desired number of first and second release layers are formed; and
  b. forming a membrane stratum that has a different composition than the release stratum whereby the membrane stratum remains intact upon application of the dissociation stimulus on the surface of the release stratum, the membrane stratum being formed by a method comprising:
    i. applying a first membrane solution comprising a first membrane polyelectrolyte onto the surface of the release stratum whereby the first membrane polyelectrolyte in the first membrane solution is adsorbed onto the surface of the release stratum to form a first membrane layer comprising the first membrane polyelectrolyte;
    ii. applying a second membrane solution comprising a second membrane polyelectrolyte that is oppositely-charged from the first membrane polyelectrolyte whereby the second membrane polyelectrolyte is adsorbed onto first membrane layer to form a second membrane layer comprising the second membrane polyelectrolyte; and
    iii. performing steps b.i. and b.ii. until the desired number of first and second membrane layers are formed.

28. The method as set forth in claim 27 wherein the first release solution, second release solution, first membrane solution and second membrane solution are applied by spraying.

29. The method as set forth in claim 28 further comprising rinsing each layer with a rinsing liquid prior to applying the next layer, the rinsing liquid being free of polyelectrolyte and comprising a solvent for the polyelectrolyte in the layer being rinsed.

30. The method as set forth in claim 29 wherein the rinsing liquid comprises a salt.

31. The method as set forth in claim 30 wherein the salt is sodium chloride.

32. The method as set forth in claim 29 wherein the concentration of salt in the rinsing liquid is less than about 10 percent by weight of the rinsing liquid.

33. The method as set forth in claim 29 wherein the rinsing liquid comprises an organic modifier.

34. The method as set forth in claim 33 wherein the organic modifier is selected from the group consisting of ethanol, methanol, propanol and mixtures thereof.

35. The method as set forth in claim 28 wherein the concentration of organic modifier in the rinsing liquid is less than about 50 percent by weight of the rinsing liquid.

36. The method as set forth in claim 27 wherein each solution comprises about 0.01% to about 40% by weight of the respective polyelectrolyte.

37. The method as set forth in claim 27 wherein each solution comprises about 0.1% to about 10% by weight of the respective polyelectrolyte.

38. The method as set forth in claim 27 wherein each solution comprises a salt.

39. The method as set forth in claim 38 wherein the salt is sodium chloride.

40. The method as set forth in claim 38 wherein the concentration of salt in the first and second solutions is about 0.01% to about 10% by weight of each solution.

41. The method as set forth in claim 27 wherein the first and second membrane solutions comprise a biomacromolecule selected from the group consisting of a protein, a polypeptide, an enzyme, deoxyribonucleic acid, ribonucleic acid, heparin, alginic acid, chondroitin sulfate, chitosan, chitosan sulfate, cellulose sulfate, a polysaccharide, dextran sulfate, carboxymethylcellulose and mixtures thereof.

42. The method as set forth in claim 27 wherein the first and second membrane solutions comprise an additive selected from the group consisting of an inorganic material, a medicinal material, a surface active ion and mixtures hereof, the inorganic material being selected from the group consisting of a metallic oxide, a clay mineral, a metal colloid, semiconductor nanoparticles and mixtures thereof, the medicinal material being selected from the group consisting of an antibiotic, an antiviral, an antifungal, a coagulant, a steroid, a biocompatibilizer, a sterilizer, an anticoagulant and mixtures thereof, and the surface active ion being selected from the group consisting of stearic acid, sodium stearate, sodium dodecyl sulfate, a quaternary alkyl ammonium and mixtures thereof.

43. The method as set forth in claim 27 wherein the releaseable membrane structure is heated to increase crosslinking between the membrane polyelectrolytes.

44. The method as set forth in claim 27 wherein the releaseable membrane structure is irradiated to increase crosslinking between the membrane polyelectrolytes.

45. A method of preparing a free membrane, the method comprising:
   a. forming a release stratum on a surface of a substrate that delaminates from the surface of the substrate upon application of a dissociation stimulus, the release stratum being formed by a method comprising:
      i. applying a first release solution comprising a first release polyelectrolyte onto the substrate whereby the first release polyelectrolyte in the first release solution is adsorbed onto the surface of the substrate to form a first release layer comprising the first release polyelectrolyte;
      ii. applying a second release solution comprising a second release polyelectrolyte that is oppositely-charged from the first release polyelectrolyte whereby the second release polyelectrolyte is adsorbed onto first release layer to form a second release layer comprising the second release polyelectrolyte; and
      iii. performing steps a.i and a.ii. until the desired number of first and second release layers are formed; and
   b. forming a membrane stratum that has a different composition than the release stratum whereby the membrane stratum remains intact upon application of the dissociation stimulus to the surface of the release stratum, the membrane stratum being formed by a method comprising:
      i. applying a first membrane solution comprising a first membrane polyelectrolyte onto the surface of the release stratum whereby the first membrane polyelectrolyte in the first membrane solution is adsorbed onto the surface of the release stratum to form a first membrane layer comprising the first membrane polyelectrolyte;
      ii. applying a second membrane solution comprising a second membrane polyelectrolyte that is oppositely-charged from the first membrane polyelectrolyte whereby the second membrane polyelectrolyte is adsorbed onto first membrane layer to form a second membrane layer comprising the second membrane polyelectrolyte; and
      iii. performing steps b.i and b.ii. until the desired number of first and second membrane layers are formed; and d. applying the dissociation stimulus to delaminate the release layer thereby freeing the membrane layer from the substrate.

46. The method of claim 45 wherein the first release polyelectrolyte is poly(acrylic acid), the second release polyelectrolyte is poly(diallyldimethylammonium chloride), the first membrane polyelectrolyte is poly(styrenesulfonic acid), the second membrane polyelectrolyte is poly(diallyldimethylammonium chloride) and the dissociation stimulus is contacting the release stratum with a salt solution comprising sodium chloride having a concentration between about 0.6 M and about 3.5 M.

47. The method of claim 45 wherein the first release polyelectrolyte is poly(styrenesulfonic acid), the second release polyelectrolyte is a random copolymer of poly (acrylic acid) and poly(diallyldimethylammonium chloride), the first membrane polyelectrolyte is poly(styrenesulfonic acid), the second membrane polyelectrolyte is poly(diallyldimethylammonium chloride) and the dissociation stimulus is contacting the release stratum with a solution having a pH greater than about 6.

48. The method of claim 45 wherein the first release polyelectrolyte is poly(styrenesulfonic acid), the second release polyelectrolyte is a random copolymer of poly (acrylic acid) and poly(diallyldimethylammonium chloride), the first membrane polyelectrolyte is sulfonated poly (ether ether ketone), the second membrane polyelectrolyte is poly (diallyldimethylammonium chloride) and the dissociation stimulus is contacting the release stratum with a solution having a pH greater than about 6.

49. A method of freeing a membrane stratum from a substrate, the method comprising:
   a. providing a releaseable membrane structure comprising:
      i. the substrate;
      ii. a release stratum having a front surface and a back surface, the back surface being adsorbed to a surface of the substrate, the release stratum comprising a positively-charged release polyelectrolyte and a negatively-charged release polyelectrolyte which associated; and
      iii. the membrane stratum having a front surface and a back surface, the back surface being adsorbed to the front surface of the release stratum, the membrane stratum comprising a positively-charged membrane polyelectrolyte and a negatively-charged membrane polyelectrolyte which are associated;
      wherein the release stratum and the membrane stratum have a different composition whereby upon application of a dissociation stimulus, the release stratum dissociates from the surface of the substrate, but the membrane stratum remains intact and is released from the substrate; and
   b. applying the dissociation stimulus to dissociate the release stratum thereby freeing the membrane stratum from the substrate.

* * * * *